May 30, 1944.  D. R. KNAPP  2,350,118
WHEEL TRUCK
Filed June 3, 1941
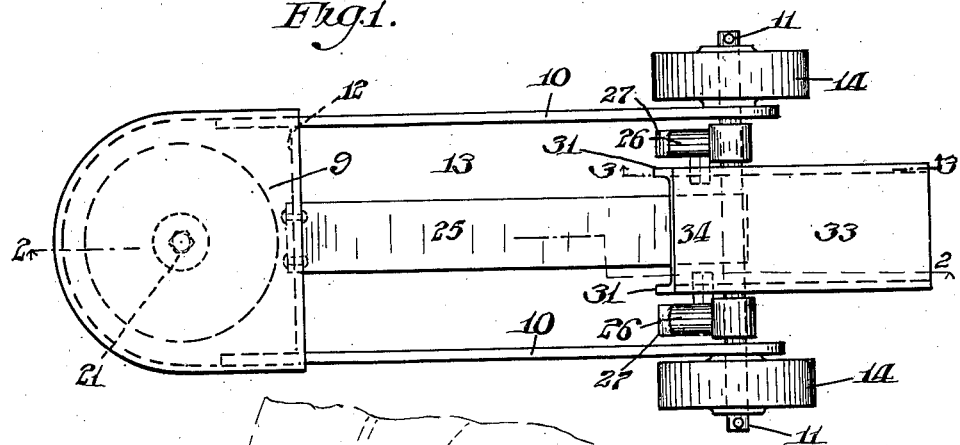
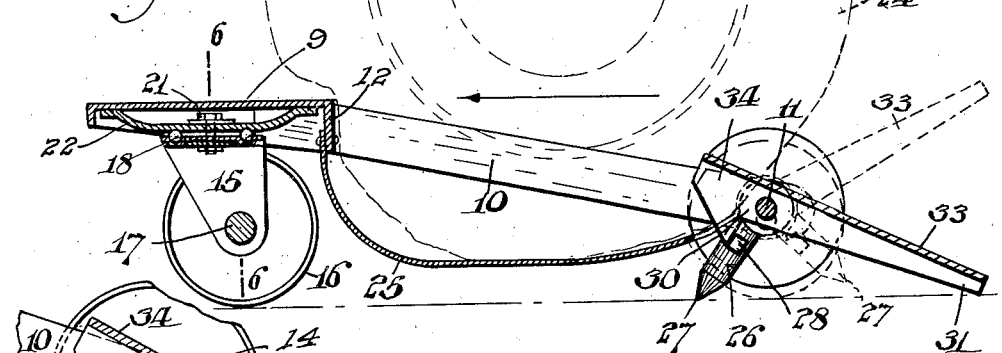
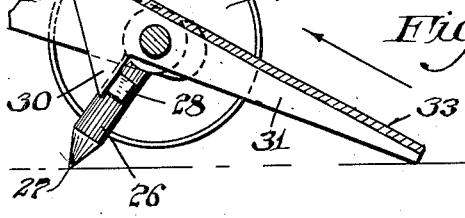
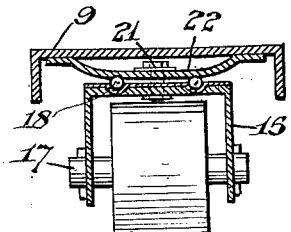
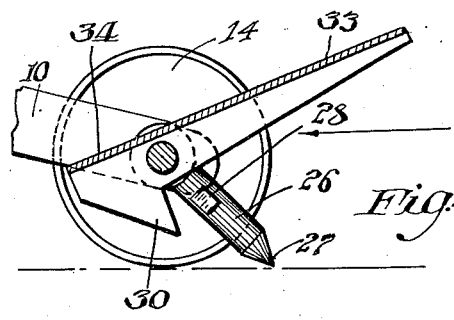
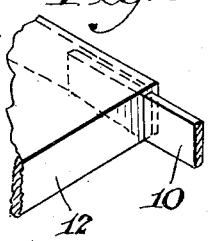
INVENTOR.
David R. Knapp
BY Barr, Borden & Fox
ATTORNEY.

Patented May 30, 1944

2,350,118

UNITED STATES PATENT OFFICE 2,350,118

WHEEL TRUCK

David R. Knapp, Philadelphia, Pa., assignor, by mesne assignments, to Rol-A-Way Company, Inc., Philadelphia, Pa., a corporation of Pennsylvania Application June 3, 1941, Serial No. 396,395

8 Claims. (Cl. 280—61)

The present invention relates to trucks and more particularly to a device for supporting a disabled wheel on a vehicle so that the vehicle can travel with one wheel out of contact with the ground.

In vehicles of the automotive type equipped with penumatic tires it is an ordinary occurrence for a tire to be punctured thereby making it necessary to replace the wheel with a perfect tire or to remove the tire, repair it and replace it upon the wheel. In many instances the user of the vehicle is incapable of making a wheel change or to repair a tire. If the puncture happens remote from a garage or other help, the user must wait until assistance arrives, or drive to the nearest place for aid with consequent increased damage to the tire or its complete ruination.

Some of the objects of the present invention are to provide an improved truck for movably supporting a disabled vehicle wheel; to provide a truck which can be readily put into use by the most unskilled user of the vehicle; to provide a truck which, after being placed in position, automatically elevates a wheel and takes such an operative position as will permit the vehicle to travel without further damage to the wheel; to provide a portable truck for vehicles which is light, strong and rugged for supporting a disabled vehicle wheel; to provide a truck which is so constructed and arranged as to follow the wheel track of a vehicle without becoming displaced; to provide a truck which is so constructed and arranged as to resist movement when engaged by a vehicle wheel being driven onto the truck; and to provide other improvements as will hereinafter appear.

In the accompanying drawing Fig. 1 represents a plan of a wheel truck embodying one form of the present invention; Fig. 2 represents a sectional detail showing the joining of one side frame with the front box plate taken on line 2—2 of Fig. 1; Fig. 3 represents an enlarged section on line 3—3 of Fig. 1; Fig. 4 represents a like section but showing the control parts in inactive position and as positioned when the device is moving; and Fig. 5 represents a perspective detail showing the relation between the abutment flange and the frame; and Fig. 6 represents a section on line 6—6 of Fig. 2.

Referring to the drawing one form of the present invention comprises a unitary skeleton frame formed by side bars 10 which are interconnected at one end by an axle 11, and at the other end are welded or otherwise united to a transverse depending flange 12 of a box plate 9. This flange 12 serves as a bracing strut between the bars 10 and also as an abutment for contact by an entering wheel. In plan, therefore, the frame is of elongated rectangular shape bounding an opening 13 to receive the lower tread portion of a vehicle wheel.

For supporting the rear end of the frame, the axle 11 mounts two freely rotatable wheels 14, which as shown are respectively on the outer side of the respective bars 10. Preferably also these wheels 14 have relatively wide tread surfaces to give added stability to the frame and discourage tendency to tip laterally about the longitudinal axis of the frame.

For supporting the front end of the frame, a yoke 15 straddles a wheel 16 and is supported upon the axle 17. The horizontally disposed bridge part of the yoke 15 carries a ball race 18 and is connected by a swivel bolt 21 to a bearing plate 22 fixed to the under side of the box plate 9. This forward end of the truck frame being supported from the axle 17 by the yoke 15 is thereby elevated above the rear end, while the flat side of the flange 12 becomes an abutment which intercepts the tread of a wheel 24 as it rides onto the frame. The function of this will later appear. It should be noted that the axle of the wheel 16 is so supported as to have a position well in advance of the flange 12, so that the horizontally applied pushing force on the flange 12 will act positively to propel the wheel 16 forwardly.

In order to provide a seat for the wheel 24, a concave strip 25 of strong rigid material is suspended in fixed position between the axle 11 and the flange 12, and lies in the plane of the longitudinal axis of the frame. Thus when a wheel 24 rides into the frame it will finally take a position against the abutment flange 12 and seat upon the supporting strip 25 as a cradle.

For the purpose of holding the truck stationary under the forward pressure of an entering wheel with its deflated tire, two rugged stay pins 26 are mounted for free pivotal movement on the axle 11, one being in close proximity to one side bar 10, and the other likewise located with respect to the other side bar 10. Each pin 26 has a length greater than the radius of wheels 14, and terminates in a sharp knife edge end 27 to engage the ground. When the truck is in wheel receiving position, the two pins 26 extend radially from the axle 11 to meet the ground at such a point as will cause the wheels 14 to be elevated, as shown in Fig. 2. This position is positively established through the provision of lugs 28 projecting laterally from the respective pins 26 and into the circular path of movement respectively of two detents 30. These detents 30, as here shown, are formed as integral parts of the side flanges 31 of a channel shaped ramp, which is pivotally mounted on the axle 11 at a point to provide a relatively long arm 33 at the receiving side of the axle 11, and a relatively short arm 34 at the opposite side of the axle 11. The arrangement is such, that in wheel receiving position, the long arm 33 with the pins 26 forms an inverted V structure of great strength. In this position the detents 30 engage the lugs 28 to anchor the pins 26 against movement in the direction which would cause the wheels 14 to lower prematurely.

The loading operation takes place as follows: with the ramp in the position shown in Figs. 2 and 3, a vehicle is brought into position where a wheel is in alinement with the ramp and then advanced upwardly upon the inclined long lever arm 33. The weight of the wheel load upon the inverted V structure causes the edges 27 of the pins 26 to dig into the ground surface to thereby prevent the truck from moving forward with the vehicle wheel as it rides upwardly and forwardly. When the vehicle wheel comes into engagement with the transverse frame flange 12 its center of gravity is well past the axle 11, and the tendency of the inwardly moving wheel is to not only push forwardly against the flange 12, but also attempt to ride upwardly. This latter tendency momentarily relieves the weight upon the real axle 11 so that the pins 26 function as lift levers under the forward movement of the frame and therefore throw the truck's wheels 14 upwardly and forwardly until the axle 11 travels forward of the fixed fulcrum of the pins 26. When this happens the pins 26 swing rearwardly to dragging position (shown in dotted lines) and the wheels 14 drop to truck supporting position in contact with the ground.

It will now be apparent that a complete unitary emergency truck for vehicles has been devised whereby a disabled wheel of a vehicle can be supported and the vehicle driven to a convenient repair place. Since the device comprehends driving the damaged wheel or wheel with a punctured tire onto the emergency truck provision is made, in an ingenious manner, to maintain the truck in stable equilibrium while the wheel rides onto the truck and during which operation means hold the truck stationary and resistant to the imparted forward thrust of the entering wheel. When the truck reaches its carried position upon the truck an automatic action occurs to release the holding means so that the truck is free to move as a substitute for the carried wheel.

Having thus described my invention, I claim:

1. An emergency truck for vehicles, comprising a vehicle wheel supporting frame, front and rear wheels for supporting the respective ends of said frame, and rear wheel control members pivotally suspended from said frame on the ground in front of said rear wheels for normally elevating said rear wheels, whereby forward movement of said frame causes said control members to release said rear wheels for engagement with the ground.

2. An emergency truck for vehicles, comprising a vehicle wheel supporting frame, front and rear wheels for supporting the respective ends of said frame, rear wheel control members pivotally suspended from said frame on the ground in front of said rear wheels for normally elevating said rear wheels, whereby forward movement of said frame causes said control members to release said wheel for engagement with the ground, and means on said control members to hold said frame stationary while a vehicle wheel rides into position thereon.

3. An emergency truck for vehicles, comprising a vehicle wheel supporting frame, a swivelled wheel for the front end of said frame, a rear axle on said frame, two wheels rotatably mounted on said axle, frame supporting members pivoted on said axle arranged to rest on the ground between said front and rear wheels and of a length to support said frame with the rear wheels out of contact with the ground, means to hold said members in supporting position and an abutment transversely disposed on said frame in the path of a vehicle wheel riding onto said frame for causing said frame to move relative to the ground to cause said holding means to be released whereby said rear wheels become operative as ground engaging supports.

4. An emergency truck for vehicles, comprising a vehicle wheel supporting frame, a swivelled wheel for the front end of said frame, a rear axle on said frame, two wheels rotatably mounted on said axle arranged to rest on the ground between said front and rear wheels, frame supporting members pivoted on said axle and of a length to support said frame with the rear wheels out of contact with the ground, means to hold said members in supporting position, an abutment transversely disposed on said frame in the path of a vehicle wheel riding onto said frame for causing said frame to move relative to the ground to cause said holding means to be released whereby said rear wheels become operative as ground engaging supports, and means on said members to prevent movement of said frame while a vehicle wheel rides into position thereon.

5. An emergency truck for vehicles, comprising a vehicle wheel supporting frame, a swivelled wheel for the front end of said frame, a rear axle on said frame, two wheels rotatably mounted on said axle, a ramp supported by said axle, frame supporting members pivoted to said axle having sharp ends to engage the ground to create resistance to forward movement of said axle, and means to hold said members in position to normally maintain said rear wheels out of contact with the ground, said means functioning under the push of a wheel against said frame to turn said members rearwardly to first raise said wheel higher and then to permit gravity to lower said wheels into contact with the ground.

6. An emergency truck for vehicles, comprising a frame, a swivelled wheel for the front end of said frame, an axle at the rear end of said frame, two wheels rotatably mounted on said axle, a ramp pivoted on said axle and arranged in one position to engage the ground behind said rear wheels to form one leg of a support for said axle, pins pivoted to said axle and arranged respectively in one position to engage the ground in front of said rear wheels to form the other leg of said support, means to interlock said pins and ramp to cause said support to hold said wheels out of contact with the ground, means on said pins to oppose forward movement of said frame, and an abutment located on said frame at such distance from said axle as to bring the center of gravity of a vehicle wheel, when in engagement with said abutment, in front of said rear axle, whereby said ramp is relieved of the wheel weight, and said pins and ramp are free to turn under forward movement of said frame to release said wheels to support said frame.

7. An emergency truck for vehicles, comprising a frame, a wheel for the front end of said frame, an axle at the rear end of said frame, two wheels mounted on said axle, a collapsible inverted V-shaped support for said axle, means to maintain said support in stable equilibrium with said axle wheels elevated, and means causing said maintaining means to release under forward movement of said frame, whereby said support collapses and said wheels are lowered into contact with the ground.

8. An emergency truck for vehicles, comprising a frame, a wheel for the front end of said frame, a rear axle on said frame, wheels journalled on said axle, a pair of legs having sharp edges mounted for pivoted movement with respect to said frame and of a length to assume an inclined position in contact with the ground in front of said axle, a ramp mounted for pivotal movement with respect to said frame and of a length to assume an inclined position in contact with the ground behind said rear axle, and means between said legs and ramp to hold said axle wheels out of contact with the ground, said legs being arranged to swing rearwardly as said frame moves forwardly to release said rear wheels to establish contact with the ground.

DAVID R. KNAPP.